Figure 1:
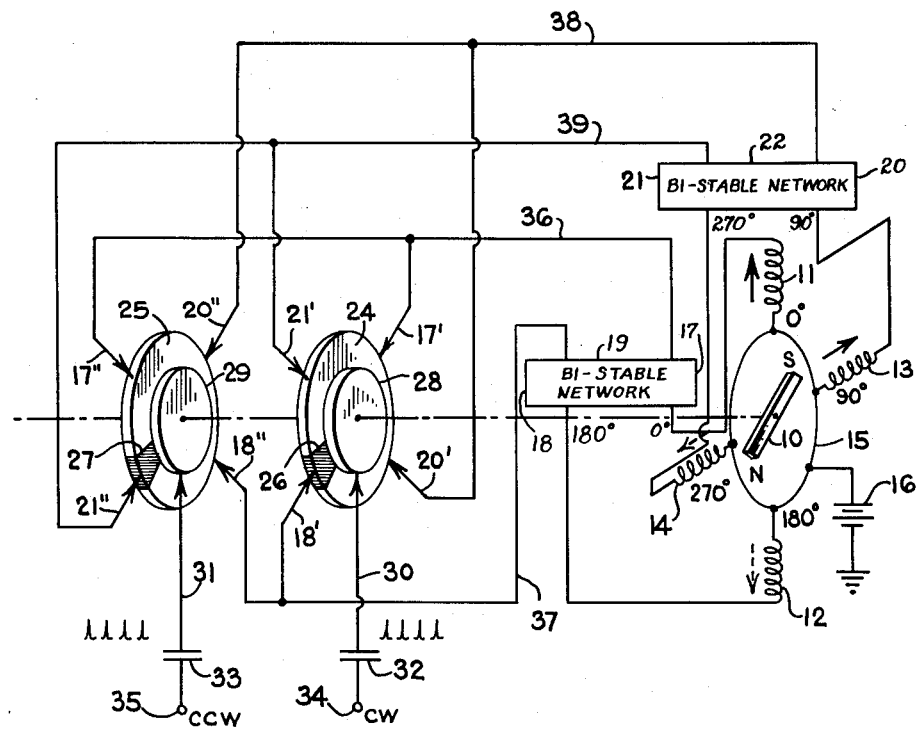

July 3, 1962  E. C. WELCH  3,042,847
ROTOR CONTROLLED STEPPER MOTOR
Filed Jan. 9, 1959

INVENTOR.
ELVIN C. WELCH
BY Elliott & Pastoriza
ATTORNEYS

ROTOR CONTROLLED STEPPER MOTOR
Elvin C. Welch, Inglewood, Calif., assignor to Automation Development Corporation, a corporation of California
Filed Jan. 9, 1959, Ser. No. 785,938
4 Claims. (Cl. 318—254)

This invention relates generally to electrical control systems, and more particularly to a motor control system in which a shaft is caused to rotate in discrete steps in response to electrical pulses.

Conversion of electrical pulses into discrete increments of mechanical shaft rotation finds many applications. For example, digital computer data can be readily converted into analogue form for use in an analogue type computer. In assembly line operations, automatic machine tools can be sequentially controlled and remote valves and the like may be positioned by means of such motors.

Heretofore, stepper motors have generally comprised a conventional synchronous motor having stator windings energized to establish magnetic fields in certain directions in response to input pulses. The rotor itself is magnetic or electrically magnetized so that it will align itself with the resultant of the established magnetic fields. Thus, by sequentially varying the position of the resultant of the magnetic fields by sequential energizing of the stator windings, the rotor can be made to step around through discrete arcs.

In order to provide a logic circuit for controlling the desired sequential energization of the stator windings in response to the input pulses, relatively complicated switching systems have heretofore been required. When relays are employed, the response time of the motor is limited by the mechanical inertia of the relays. In addition, the other known limitations of mechanical relays are present. In circuits employing transistors for switching, a relatively large number are required resulting in a corresponding increase in the manufacturing cost. While transistors are reliable, it is still desirable to minimize the number that are necessary in any particular circuit; not only because of the cost factor of the transistors themselves, but because of the increased labor and time involved in fabricating the circuit.

The number of switching operations in some stepper motor logic circuits employed heretofore can be reduced by providing actuating electrical pulses in the form of a square wave or wave form having equal duty cycles. In other words, a fixed voltage would be supplied for a given length of time to step the rotor through a first step. Cessation of this voltage for an equal length of time would effect the next step, and so on. It is preferable, however, to provide a system which is responsive to simple pulses of electrical energy, such as spikes wherein there is no dependence upon the particular wave shape or magnitude of the pulses.

Bearing the foregoing in mind, it is a primary object of the present invention to provide a novel stepper motor in which the rotor shaft is caused to step through discrete angles in response to electrical pulses and in which the required number of relays, transistors, diodes or other switching components heretofore deemed necessary for operating such a motor is greatly reduced with the attendant advantages of simplicity and circuit design and economy in manufacture.

Another important object of this invention is to provide a stepper motor which is responsive to simple electrical pulses in which only the leading edge is necessary and its actual wave shape or duration within limits will not affect the operation of the motor.

More general objects of the invention are to provide an improved stepper motor meeting the foregoing objects which is light and compact and employs less components than have heretofore been required in stepper motors performing similar functions.

Briefly, these and many other objects and advantages of this invention are attained by providing a rotor and suitable stator windings. Control means are connected to the stator windings for sequentially energizing them in response to a succession of pulses. Rather than a plurality of relays or transistor type switches for properly distributing actuating pulses to the respective control means, the present invention incorporates a simple commutator disc co-axially mounted on a common shaft with the rotor for rotation therewith. This disc includes a conducting portion co-operating with brushes disposed about the periphery of the disc. The initiating electrical pulses are fed to the conducting portion of the disc by means of a continuous conducting ring. Only the brush in engagement with the conducting portion of the disc receives the particular energizing pulse. Therefore, the particular stator winding energized depends upon the position of the disc and thus on the position of the rotor. In other words, each step of the rotor itself in response to one pulse serves the function of re-establishing the connections between the input and the various control means for the stator windings for effecting the next step in response to the next pulse.

By providing an additional commutator disc on the same rotor shaft together with an additional input and additional brushes connected in a reverse manner to the control means, the rotor can be made to step around in an opposite direction in response to electrical pulses fed into the additional input.

Figure 2:
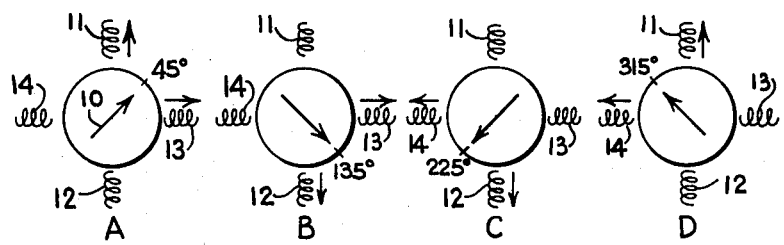

A better understanding of the foregoing as well as other features and advantages of this invention will be had by referring to the accompanying drawings, in which:

FIGURE 1 is a highly schematic circuit diagram illustrating one embodiment of the stepper motor of this invention; and, FIGURE 2 is a series of diagrams of various rotor positions useful in explaining the operation of the circuit illustrated in FIGURE 1.

Referring first to the right hand portion of FIGURE 1, there is schematically illustrated a rotor 10 which may, for example, be in the form of a permanent magnet having north and south poles N and S as shown. Alternatively, the rotor 10 could be magnetically polarized by a simple electro-magnet. Positioned about the rotor 10 are first and second pairs of stator windings 11, 12, and 13, 14. As shown, the two windings of the first pair are disposed on vertical diametrically opposite sides of the rotor and the two windings of the second pair are disposed on horizontal diametrically opposite sides of the rotor and thus spatially displaced 90° from the first pair. By this arrangement, a first magnetic field established by either one of the windings 11 or 12 of the first pair will be directed along a first axis while a second magnetic field established by either one of the second pair of stator windings 13 and 14 will be directed along a second axis at right angles to the first axis.

The inner terminals of each of the windings comprising the two pairs are all commonly connected to a conductor 15 energized by a D.-C. source such as indicated by the battery 16. By grounding any of the far terminals of the windings, there will result a current flow through the winding establishing a magnetic field in the direction of the solid arrows, for example, in the case of the coils 11 and 13, or in the direction of the dotted line arrows in the case of the coils 12 and 14.

In order to control the energization of the stator windings for stepping the rotor 10 in a desired manner, there are provided first and second control means in the form of bi-stable electrical networks. As shown in FIGURE 1, for example, the outer terminals of the windings 11 and 12 connect to the two sides 17 and 18 of a first bi-stable electrical network 19. Similarly, the outer terminals of the coils 13 and 14 connect to the two sides 20 and 21 of a second bi-stable electrical network 22. Bi-stable electrical networks are well known in the art and are characterized by having either one side or the other conductive at all times but never having both sides conductive at the same time. The networks are further characterized by switching from one side to the other in response to reception of a pulse in the non-conducting side.

In FIGURE 1, the rotor shaft is schematically illustrated by the dashed dot lines 23. Secured to this shaft are suitable actuating means in the form of commutator discs 24 and 25. These discs have insulated peripheries except for small conducting portions or sectors indicated at 26 and 27. The discs also include continuous conducting rings 28 and 29, respectively, electrically connected to the conducting portions 26 and 27. Input brushes 30 and 31 continuously engage the conducting rings 28 and 29 as shown. These input brushes pass from one side of condensers 32 and 33, the other sides of which connect to input terminals 34 and 35.

Co-operating with the commutating disc 24 are four brushes 17', 18', 20' and 21'. The brushes 17' and 18' are diametrically disposed to engage opposite diametric portions of the commutator disc 24 while the brushes 20' and 21' are similarly diametrically positioned but form an angle of ninety degrees with respect to the first brushes. The diametrically opposite brushes 17' and 18' are connected through electrical conductors 36 and 37 to the sides 17 and 18 of the first bi-stable electrical network 19. The other pair of diametrically opposite brushes 20' and 21' are similarly connected through electrical conductors 38 and 39 respectively to the sides 20 and 21 of the second bi-stable electrical network 22.

The commutator disc 25 similarly include four brushes disposed diametrically and indicated by 20", 21", 17" and 18". The diametrically opposite brushes 20" and 21", which correspond in position on the commutator disc 25 to the brushes 17' and 18' associated with the commutator disc 24, are connected to the electrical conductors 38 and 39, respectively, to pass to the sides 20 and 21 of the bi-stable electrical network 22. The brushes 17" and 18", which correspond in position on the disc 25 to the position of the brushes 21' and 20' for the disc 24, are connected through the electrical conductors 36 and 37 to the sides 17 and 18 of the bi-stable electrical network 19. Thus, the four brushes associated with the conducting disc 25 are connected in an opposite sense with respect to the two bi-stable electrical networks, relative to the four brushes associated with the commutator disc 24.

By the above described arrangement and with reference first to the disc 24, it will be evident that as the rotor 10 rotates and thus rotates the shaft 23, the commutator disc 24 will be rotated in such a manner that the conducting portion 26 will sequentially and individually engage the brushes 21', 17', 20', and 18'. Similarly, the commutator disc 25 will simultaneously be rotated so that the corresponding conducting portion 27 will sequentially and individually engage the brushes 17", 20", 18", and 21".

Referring now to both FIGURES 1 and 2, the operation of the above described stepper motor will be described. Assuming that the rotor 10 is in the position illustrated in FIGURE 1 and as indicated by the arrow 10 in diagram A of FIGURE 2, in the absence of any pulses at the input terminal 34, the side 17 of the bi-stable electrical network 19 will be conducting and the side 18 will be non-conducting. The network will remain in this condition until reception of a pulse. Similarly, the side 20 of the bi-stable electrical network 22 is conducting and the side 21 is non-conducting, and this condition will remain until reception of a pulse by the bi-stable network 22. The coils 11 and 13 are thus energized and first and second magnetic fields will be established as indicated by the solid arrows in FIGURE 1. The resultant of these magnetic fields will be a resultant magnetic field at 45° and thus the rotor 10 is aligned at 45° as shown.

Assume it is desired to step the rotor in a clockwise direction. For this purpose input pulses are applied to the input terminal 34. In the event this pulse is in the form of a square wave or some other type of wave form, the condenser 32 will essentially differentiate the wave form to produce a short duration pulse having a sharp leading edge. This spike or trigger will pass through the input brush 30 to the conducting ring 28, conducting portion 26 on the commutator disc 24 to the brush 18'. From the brush 18', the trigger pulse will be transmitted through the electrical conductor 37 to the side 18 of the bi-stable network 19. Reception of this pulse by the bi-stable network will then cause the side 18 on the bi-stable network to commence conducting and simultaneously cause the side 17 to cease conducting. As a consequence, current from the battery 16 will pass down through the coil 12 and the conducting side 18 of the bi-stable element 19 to ground. Thus, the magnetic field established by the coil 11 will terminate and a magnetic field will be established in the opposite direction by the stator winding 12. Since the other three brushes 21', 17', and 20' are engaging insulative portions of the commutator disc 24, the bi-stable network 22 will not be affected by the pulse of electrical energy. Therefore, the stator winding 13 will remain energized. As a consequence of the termination of the magnetic field in the coil 11 and the establishment of a magnetic field in the opposite direction by the coil 12, the resultant of the first and second magnetic fields will now be directed at 135°. The rotor 10 will align itself with this resultant by rotating through a 90° arc from its initial position of 45° to 135° as indicated by the arrow in diagram B of FIGURE 2.

Rotation of the rotor through this 90° arc will cause the commutator disc 24 to be rotated 90° and thus place the conducting portion 26 in engagement with the brush 21'. As long as no further pulses are received, the rotor 10 will remain in the 135° orientation as indicated in diagram B.

Upon reception of the next pulse at the input terminal 34, the side 21 of the bi-stable network 22 will be triggered through the conducting portion 18' which is now in engagement with the brush 21' and the electrical conductor 39. Triggering of the side 21 will cause this side to conduct and simultaneously render the side 20 non-conductive. As a consequence, the magnetic field established in the coil 13 will terminate and a current will flow from the battery 16 through the common connecting conductor 15 and the coil 14 to ground through the conducting side 21. This current establishes a magnetic field in an opposite direction as indicated by the dotted line arrow. Since the brushes 17', 20', and 18' are no longer in engagement with the conducting portion 26 in this position, the bi-stable network 19 will not be affected. Thus, the resultant of the established magnetic fields will now lie in a direction at 225° and the rotor 10 will align itself by rotating through another arc in a clockwise direction of 90° to the position illustrated in diagram C of FIGURE 2. This rotation of the rotor will rotate the commutator disc 24 through 90° so that the conducting portion 26 now engages the brush at 17'.

The next pulse will thus be passed through the brush 17' and electrical conductor 36 to the side 17 of the bi-stable electrical network 19 to cause the side 17 to conduct and to terminate conduction of the side 18. The magnetic field formerly established in the stator winding 12 will terminate and a magnetic field will be established in the stator winding 11. Since the other bi-stable electrical network 22 is not affected by this last received pulse, the magnetic field in the winding 14 will remain and the new resultant will be aligned at 315° as indicated in diagram D. The rotor will align itself with the new angle and again move the commutator disc 24 through a 90° arc so that the conducting portion 26 will now be in engagement with the brush 20'.

Finally, upon reception of another pulse the side 20 of the bi-stable network 22 will be caused to conduct and the side 21 rendered non-conductive so that the stator winding 13 will be energized and the stator winding 14 de-energized. The directions of the first and second magnetic fields will then be as shown in diagram A and the rotor 10 will align itself at 45° back to its initial position. In so aligning itself back to its initial position, it will simultaneously move the conducting disc 24 back to the position illustrated in FIGURE 1.

When pulses are applied to the input terminal 35 rather than the input terminal 34, the connections of the brushes to the commutator disc 25 are such that the rotor will be caused to move in 90° steps in a counter-clockwise direction. The sequence of operation can be readily followed through and is identical to that described in connection with the conducting disc 24 except that the fields are established in an opposite sense to step the rotor in the desired counter-clockwise direction.

It will be immediately evident from the foregoing description that other means may be provided for reversing the stepping action. For example, the additional commutator disc 25 could be eliminated and a simple double pole double throw reversing switch provided in the electrical conductors 36, 37, 38, and 39 to interchange these connections. When it is desired to cause the rotor to step in a counter-clockwise direction, the conductors 36 and 37 would be connected to the sides 20 and 21 of the bi-stable network 22, and the conductors 38 and 39 connected to the sides 18 and 17 of the bi-stable network 19.

It will also be evident from the foregoing description that the use of a commutator disc co-operating with the rotor eliminates the necessity of several switching relays, transistors or diodes, heretofore thought necessary in order to provide a suitable logic for sequentially energizing the stator windings. In essence, therefore, each time the rotor executes a 90° step in accordance with the present invention, it re-establishes proper connections in ready condition for reception of the next pulse to effect the next 90° step rotation. This second step rotation in turn automatically re-establishes proper connections rendering the circuit ready for reception of the third pulse and so forth.

While only a preferred embodiment of the invention has been set forth and described, it will be evident to those skilled in the art that many minor changes can be made without departing from the scope and spirit of the invention. The improved rotor controlled stepper motor is, therefore, not to be thought of as limited to the specific embodiment set forth for illustrative purposes.

What is claimed is:

1. A stepper motor comprising, in combination: a magnetic rotor; a first pair of stator windings spatially positioned on diametrically opposite sides of said rotor; a second pair of stator windings spatially displaced ninety degrees from said first pair respectively; first control means connected to said first pair of stator windings and responsive to successive electrical signals for successively alternately energizing each winding of said first pair to establish a first magnetic field in one direction along a first axis and in an opposite direction along said first axis; second control means connected to said second pair of stator windings and responsive to successive electrical signals for successively alternately energizing each winding of said pair to establish a second magnetic field in one direction along a second axis and then in an opposite direction along said second axis, said second axis being at right angles to said first axis, and said rotor aligning itself with the resultant of said first and second magnetic fields; input means for receiving a series of successive electrical signals; actuating means connected to said input means; and means coupling said actuating means to said rotor for movement therewith for effecting connection of said actuating means alternately to said first and second control means each time said rotor moves through a discrete step.

2. The subject matter of claim 1, in which said first and second control means comprises first and second bi-stable electrical networks having their respective two sides connected to the respective stator windings in said first and second pairs; said actuating means comprising a commutator disc mounted co-axially with said rotor; four brushes circumferentially spaced ninety degrees about said disc, said disc having a conducting portion arranged to engage successively and individually said brushes upon each ninety degree rotation of said rotor, said input means being connected to said conducting portion and electrical conductors connecting diametrically opposite brushes respectively to the two sides of each of said first and second bi-stable electrical networks respectively.

3. The subject matter of claim 2, including an additional commutator disc mounted co-axially with said rotor, four additional brushes circumferentially spaced ninety degrees about said additional disc, said additional disc having a conducting portion arranged to engage successively and individually said additional brushes upon each ninety degree rotation of said rotor; said additional brushes and conducting portion on said additional disc being similarly spatially positioned with reference to said four brushes and first mentioned conducting portion on said first mentioned disc; additional input means connected to said conducting portion for said additional disc; and electrical conductors connecting diametrically opposite ones of said additional brushes to the two sides of each of said second and first bi-stable electrical networks respectively, whereby reception of electrical signals by said additional input means causes said rotor to step in a direction opposite to the direction it is stepped when electrical signals are received by said first mentioned input means.

4. A stepper motor comprising, in combination: stator windings positioned to generate magnetic fields in directions angularly displaced from each other; a rotor aligning itself with the direction of the magnetic field generated by said stator windings so that a given sequential energization of said stator windings causes said rotor to step through discrete angles; control means connected to said stator windings, respectively, and responsive to electrical pulses for energizing said stator windings; input means for receiving a series of successive electrical signals; and rotor driven switching means comprising actuating means physically connected to said rotor for movement with said rotor, said actuating means being disposed between said input means and control means for coupling said input means to said control means to distribute said successive electrical signals to various ones of said control means in accordance with the position of said rotor to effect said sequential energization of said stator windings.

References Cited in the file of this patent

UNITED STATES PATENTS

| 2,706,270 | Steele | Apr. 12, 1955 |
| 2,725,512 | Padron | Nov. 29, 1955 |
| 2,809,335 | Welch | Oct. 8, 1957 |